Figure 1:
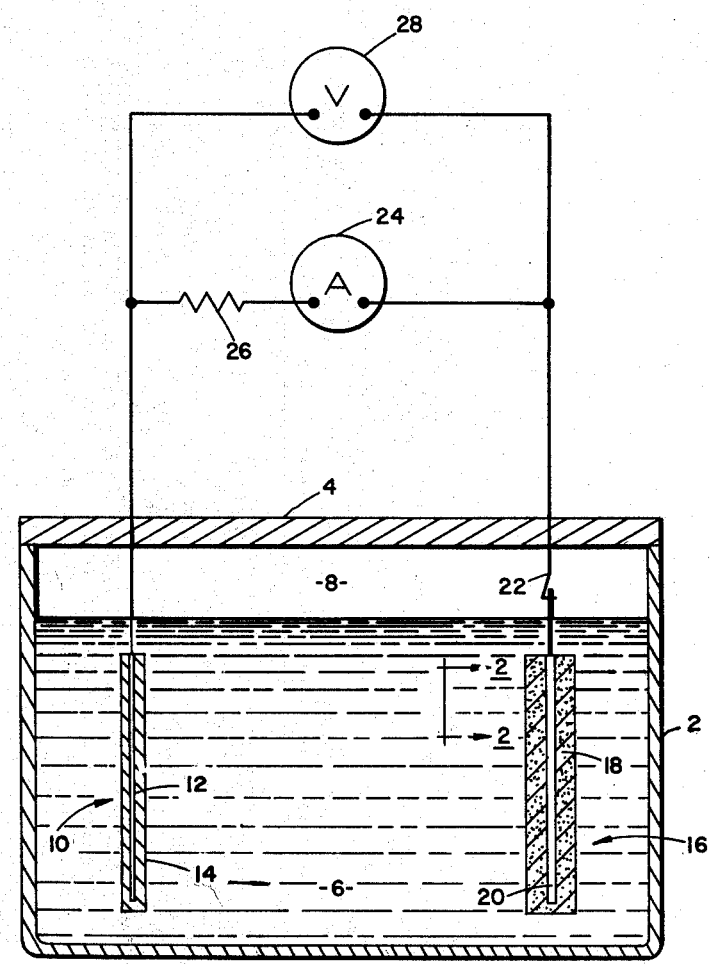

INVENTOR.
STANLEY W. MAYER
DONALD E. McKENZIE
BY Gerald G. Koris
ATTORNEY

United States Patent Office 3,185,590
Patented May 25, 1965

3,185,590
LIGHTWEIGHT SECONDARY BATTERY
Stanley W. Mayer, Canoga Park, and Donald E. McKenzie, Woodland Hills, Calif., assignors to North American Aviation, Inc.
Filed Jan. 6, 1961, Ser. No. 81,034
13 Claims. (Cl. 136—6)

Our invention relates to a lightweight secondary battery, and more particularly to a rechargeable lightweight battery whose cells have a light metal anode, an electron-exchange organic polymer cathode, and an organic electrolytic solution.

Batteries are assemblages of cells in which chemical energy is converted into electrical energy by electrochemical processes occurring as current is withdrawn. Batteries or cells are usually categorized as primary, and secondary or storage. The primary cells do not have practically reversible chemical reactions, that is, the cells cannot be recharged. The secondary or storage cells can undergo reversible reactions, and can be recharged by applying current to the electrodes in a reverse manner to the discharge cycle.

A major factor limiting even wider use of storage batteries, such as the conventional lead, nickel-iron, and silver-zinc types, is their weight. If batteries were of lighter weight, and of greater output per unit weight, they would find considerably more widespread use, for instance in propulsion devices; lightweight batteries could also break into the battery replacement business. A principal factor in the total weight of the lead storage cells now in widespread use is the weight of the electrodes. For example, although a total of about 8.3 grams of Pb and $PbO_2$ is required to produce 1 ampere-hour (at 1.95 volts), the actual weight of the electrodes may be about 60 grams (per ampere-hour, 5-hour discharge) which is 67% of the weight of the battery. Furthermore, the electrolyte is consumed in operation of the typical storage cell. For instance, the $H_2SO_4$ electrolyte in the lead cell is consumed in converting the Pb and $PbO_2$ electrodes to $PbSO_4$.

Accordingly, an object of our present invention is to provide a lightweight secondary battery.

Another object is to provide a lightweight, rechargeable battery having electrodes of low equivalent weight and high electrode potential.

Another object is to provide such a battery wherein the electrodes are dimensionally and chemically stable in an electrolyte.

Still another object is to provide such a battery which will deliver large currents at high voltages over an extended period of time.

Still another object is to provide such a battery in which the electrolyte is not consumed during operation.

A still further object is to provide a lighweight, stable, long-lived, readily rechargeable battery having a light mental anode, an organic electron-exchange polymer cathode, and an electrolyte in an organic solvent.

The above and other objects and advantages of our invention will become apparent from the following detailed description.

Figure 2:
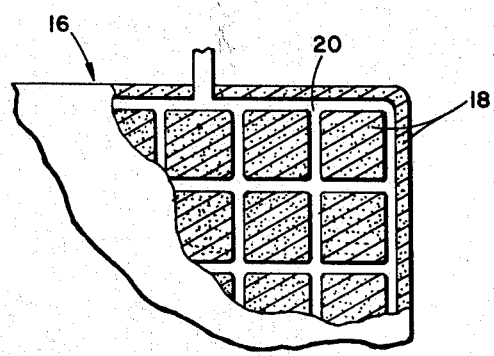

In the drawings FIG. 1 is a schematic representation of our battery, and FIG. 2 is a section, partly in elevation, of a portion of an electrode in FIG. 1 taken along the lines 2—2.

Our present invention comprises in a lightweight secondary battery, a light metal as the active anode material and as the electrolyte, a salt, generally of the anode metal, in an organic solvent, wherein the battery components, particularly the light metal anode, are stable. The cathode is a shaped, lightweight electron-exchange organic polymeric material that functions as an active acceptor or receiver of electrons.

A high electrochemical potential exists between the anode and cathode, in view of the strong electropositive nature of the light metal reductant. This contributes significantly to the high output voltage and current of the battery, the voltage being several factors higher than in the conventional lead battery. There is little consumption or change of the electrolyte during operation. Furthermore, the low chemical equivalent weight of the electrode materials, that is, the weight of material required to give a faraday of electricity, is a factor of about 4.0 less than that of the lead storage cell (e.g., ~80 vs. ~320), thus resulting in improved watt-hours per pound ratio for the battery. The voltage is a factor of about 1.5 greater than in the lead battery. Thus, the overall improvement in weight per unit voltage over the lead battery is by a factor of 6. The light metal electrode is very stable in the organic solvent, the system is readily rechargeable, and the life expectancy is high, thereby contributing still further to the economic advantages of our invention.

The anode in our battery is a light metal having a chemical equivalent weight (that is, atomic weight divided by the valance of the active ion) less than about 70. The light metals are strongly electro-positive, thereby providing a high electrode potential between cathode and anode. The low chemical equivalent weight of the anode is very beneficial in obtaining the desired light weight of the battery. Of particular interest are the light alkali metals, such as lithium, sodium, and potassium; also magnesium, beryllium, and aluminum. The low equivalent weight metals having equivalent weights of less than about 70 fall in the first four periods of the Periodic Chart of the Elements and examples are lithium, beryllium, boron, sodium, magnesium, aluminum, potassium, calcium, titanium, vanadium, chromium, manganese, iron, cobalt, nickel, copper and zinc.

The cathode is a shaped lightweight electron exchange resin, for example, a polymer such as polyquinone compound, i.e., a polymeric compound having quinone grouping, which reversibly undergoes electron exchange reactions, that is, donating and/or receiving electrons, or, in still other terms, undergoing oxidation-reduction reactions. Examples of such redox polymers are polymers of oxygen-containing compounds such as para-quinone and ortho-quinone; polymers of sulfur-containing compounds such as disulfides, thioquinone, sulfoxides, formamidine disulfides; and polymers of nitrogen compounds such as hydrazo compounds, azo compounds, azoxy compounds, and hydroxylamines. For further information regarding such electron exchange resins for use as cathodes in our battery, reference is made to the copending application of the common assignee S.N. 257, filed January 4, 1960 in the name of S. W. Mayer for "Lightweight Electrode."

The electrolyte of the battery comprises a salt of at least one of the foregoing anode metals in an organic solvent which will not corrode the light metal electrode. The choice of organic solvent is wide and the use of any particular solvent or solvent class is not inert organic solvents, without readily releasable hydrogen ions, which are suitable as the solvent is large, for example formadines, ethers, pyridines, sulfoxides, nitriles, cyclic ethers, amines, and amides. The common forms of such well known organic solvent classes are suitable for the present purpose, for example, the following ethers: ethyl, ethylmethyl, phenylethyl, propylethyl, and diethyl; amines including ethylmethyl, diethyl, ethylenediamine, aniline, pyridine, and other cyclic amines; amides such as acetamide, dimethyl acetamide, ethylmethyl acetamide, formamide, dimethylformamide, and benzamide; sulfoxides including dimethyl, diethyl, ethylmethyl, and benzylmethyl sulfoxide; nitriles illustrated by acetonitrile and proprionitrile; and dioxan and other cyclic ethers such as propylethyl cyclic ether. All such inert solvents are of relatively low molecular weight and are intended to have no readily releasable hydrogen ions which would react with the light metal anode. For other information concerning inert, organic solvents which may be used in the present battery, reference is made to Andrieth and Kleinberg, "Non-aqueous Solvents," published by John Wiley & Sons, Inc., New York, N.Y. (1953).

The salts for use as solutes in the foregoing solvents and which function satisfactorily as the active electron carrier or electrolyte, are the common soluble salts of the above indicated anode metals. Generally, the cation of the salt will be of the same metal as the anode in a given cell, but such is not required and combinations of salts of the foregoing metals may be used as solutes. Such common soluble salts of the above light metals as the halides, nitrates, phosphates, thiocyanates, sulfides, sulfates, cyanides, picrates, acetylacetonates, fluoborates, hydrides, and borohydrides may be used. Other examples are well known to the art, as indicated in the above text.

In view of the inert nature of the organic solvent, the choice of the bare electrode conductors for attachment to the cathode and anode is very wide, as corrosion usually is not a problem. Convenience and economy may therefore dictate the selection. Among the satisfactory electrode conductors are tungsten, aluminum, stainless steel, steel, graphite, $PbO_2$, platinum, copper, nickel, silver, iron, and brass.

The classical representation of a model of our cell, using a lithium anode, lithium chloride in dimethyl formamide as the electrolytic solution, and a polyquinone as the cathode, with tungsten as the inert metal for the lithium electrode and platinum as the inert metal for the resin electrode, is as follows.

W, Li | LiCl in dimethyl formamide | resin in polyquinone form, Pt

The electrode reactions for this cell can be represented by:

Anode: $nLi \longrightarrow nLi^+ + ne$

Cathode: A polyquinone + $nLi^+$ + ne $\longrightarrow$ a polylithioquinone

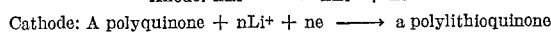

Cell Reaction: nLi + a polyquinone $\underset{\text{charge}}{\overset{\text{discharge}}{\longrightarrow}}$ a polylithioquinone

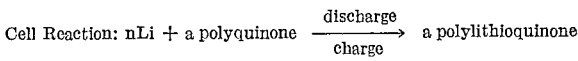

Some forms of a foregoing suitable cathode resins are polymers of phenols or have phenolic components, for instance the quinone in polymerized hydroquinone form, and thus can liberate $H^+$ ions into basic electrolytes; the released $H^+$ ions then can attack the lithium metal to evolve hydrogen. Such can be prevented by removing the phenolic hydrogens by treatment with an aqueous solution of a salt of the anode metal, followed by washings with the organic electrolyte solvent. For example, the phenolic hydrogens of a polyhydroquinone may be removed by treatment with a strong solution of lithium hydroxide (e.g., 1 N LiOH) followed by washings with dimethyl formamide. This results in obtaining the lithium form of the resin, corresponding to the discharge state in the above cell reaction. With the cathode prepared in such manner, the anode of the battery, as originally assembled, would then be the bare conductor electrode. The lithium would be returned to the anode by charging the battery prior to use.

The polymer material may be shaped or formed into a cathode structure for use in our battery in the manner taught in the copending applications, for example, by pressing and casting. Further, as in the copending applications, the electrical conductivity of the resin may be improved by mixing in such inorganic electrical conductor materials as powders of graphite, carbon black, silver, platinum, nickel, chromium, and copper, graphite being the more generally used material. In the present invention a typical cathode structure may be made by mixing the lithium form of a polyquinone resin with about 20% graphite and pressing the resulting composition on to a platinum screen, the screen providing structural support and serving as the bare conductor to the external circuit.

Referring now to the drawings, a schematic representation of an embodiment of our battery is shown in FIG. 1. The battery is contained in a case 2 which may be of a lightweight material in view of the noncorrosive nature of the electrolyte. For example, fiberglass and plastic materials may be used, as well as metals such as aluminum and stainless or carbon steel. A seal 4 keeps air out of the structure and, in the event the electrolyte 6 does not fully fill the container, as in the drawing, the air space 8 is filled with an inert gas, such as nitrogen or one of the noble gases such as helium. The anode structure 10 comprises the metal conductor 12 onto which the active anode material 14, the light metal, is impressed. The cathode structure 16 comprises the electron-exchange organic resin 18, mixed with graphite, pressed onto a screen 20, as seen in FIG. 2. A conductor wire 22 in looped through a wire laced into the screen and the electrode completed. The external circuit comprises a multi-range ammeter 24, a resistive load 26, and a voltmeter 28 across the cell.

The following examples are offered to illustrate our invention in greater detail.

EXAMPLE I

The cell described above with reference to the drawings is employed. The cell consists of a glass cylinder, and an inert atmosphere of nitrogren is maintained above the electrolyte.

The cathode is prepared by mixing 0.6 gram of the lithiated form of a polyquinone resin with about 0.6 gram of graphite in an electrolyte paste. Half of the mixture is placed on a one-inch diameter filter paper in a press cylinder, a one-inch diameter 50-mesh platinum screen is positioned, and the rest of the mixture added, followed by a second filter paper. The cylinder is pressed at 12,500 p.s.i. for approximately 5 minutes. The contact wire is looped through a wire laced into the screen and the electrode completed.

The anode prior to being formed comprises a bare molybdenum sheet as the inert electrode.

The electrolyte is prepared by adding 25 grams of of dry LiCl to 1 liter of dimethyl formamide. About 3 grams of freshly cut sodium is added to remove any water that may be present, and the mixture allowed to stand for about 12 hours before use.

The first step consists of charging the cell (about 4.1 volts, $3.5 \times 10^{-3}$ amps) for 2.7 hours. In this step the resin is converted to a polyquinone form and lithium metal is deposited on the molybdenum anode foil. On dicharge, current densities greater than $10 \times 10^{-3}$ amps/cm.$^2$ are obtained, with the external load being 10 ohms. The external resistor setting is raised to 810 ohms to slow the discharge rate to $0.4 \times 10^{-3}$ amps/cm.$^2$ (compared to $0.9 \times 10^{-3}$ amps/cm.$^2$ for the lead storage battery).

Initial charge efficiency is 38% and during the test it decreased to 33%. Internal resistance depends upon cell voltage and ranges from 21 ohms at full charge voltage of 3.7 volts to 79 ohms at 1 volt. The average efficiency for two one-half hour charge cycles is 29.3%. Coulomb efficiency is 71% at the start and decreases to 53% during the test.

EXAMPLE II

The same as Example I, except that the anode is copper plus deposited aluminum, the cathode is an azobenzene polymer, and the electrolytic solution is 1% $AlCl_3$ and $LiAlH_4$ in diethyl ether. This battery gives 51 milliamps at 2 volts.

EXAMPLE III

The same as Example I, except that the anode is steel plus deposited potassium, the cathode an anthraquinone polymer, and the electrolyte 10% KCNS in dimethylsulfoxide. This battery on discharge gives 100 milliamps at 3.4 volts.

EXAMPLE IV

The same as Example I, except that the anode is graphite tubes plus deposited magnesium, the cathode a nitroguanidine polymer and the electrolyte 2% $MgCl_2$ in acetonitrile. The current obtained is 63 milliamps at 2.7 volts.

The above examples are illustrative rather than restrictive of our invention, which may be suitably modified by the art in accordance with our disclosure. The terms "cell" and "battery" have been used herein essentially interchangeably, unless otherwise indicated, for purposes of illustration, although it is recognized that from the point of view of precise terminology a battery is generally considered an assemblage of two or more cells. Our invention should be understood to be limited, therefore, only as is indicated in the appended claims.

We claim:

1. A lightweight secondary battery comprising a light metal anode, a cathode consisting essentially of a shaped electron-exchange organic polymer adapted to reversibly function as a donor or receiver of electrons, and a solution of an electrolyte salt in an inert organic solvent.

2. The battery of claim 1 wherein the anode is a metal selected from the group consisting of lithium, sodium, potassium, magnesium, and aluminum.

3. A battery according to claim 1 wherein said electrolyte salt is a salt of said anode metal.

4. A lightweight secondary battery comprising a lithium anode, a cathode consisting essentially of a shaped electron-exchange organic polymer which functions to receive electrons during the discharge cycle of the battery, and an electrolytic solution consisting essentially of a solution of a lithium salt in an inert organic solvent.

5. The battery of claim 4 wherein the lithium salt is lithium chloride.

6. The battery of claim 4 wherein the organic solvent is a relatively low molecular weight, inert organic solvent selected from the group consisting of formamidines, ethers, pyridines, sulfoxides, nitriles, cyclic ethers, and amides.

7. A lightweight secondary battery comprising a lithium anode, a cathode consisting essentially of a shaped lightweight electron-exchange polymeric compound having quinone grouping electrically coupled to said anode, and an electrolytic solution consisting essentially of lithium chloride in dimethyl formamide.

8. A lightweight secondary battery comprising an anode that is a light metal selected from the class consisting of lithium, sodium, potassium, magnesium, and aluminum, a cathode consisting essentially of a shaped lightweight electron-exchange organic polymer, and an electrolytic solution consisting essentially of a salt of said anode metal in an inert organic solvent.

9. The battery of claim 8, wherein said polymer has a monomeric constituent grouping selected from the class consisting of para-quinone, ortho-quinone, disulfide, thioquinone, sulfoxide, hydrazo, azo, azoxy, hydroxylamine, quinone amine, and nitro organic compounds.

10. A lightweight secondary battery comprising a lightweight metal anode selected from the class consisting of lithium, sodium, potassium, magnesium, and aluminum, a cathode consisting essentially of a shaped lightweight polymeric compound having quinone grouping, and an electrolytic solution consisting essentially of a salt of said light metal in an inert organic solvent.

11. The battery of claim 10 wherein said polymeric compound is polyvinyl quinone.

12. A lightweight secondary battery comprising a lithium anode, a cathode consisting essentially of a shaped lightweight polymeric compound having quinone grouping, and an electrolytic solution of a lithium halide salt in an inert organic solvent.

13. A lightweight secondary battery comprising a lithium anode, a cathode consisting essentially of a shaped lightweight polyvinyl quinone, and an electrolytic solution consisting essentially of lithium chloride in dimethyl sulfoxide.

References Cited by the Examiner

UNITED STATES PATENTS

| | | |
|---|---|---|
| 1,459,659 | 6/23 | Ellis et al. |
| 1,777,202 | 9/30 | Helbronner et al. |
| 1,978,624 | 10/34 | Colloseus _____ 136—155 |
| 2,786,088 | 3/57 | Robinson _____ 136—153 |
| 2,844,642 | 7/58 | Schwarz et al. |
| 2,863,933 | 12/58 | Minnich et al. _____ 136—153 |
| 2,921,110 | 1/60 | Crowley et al. _____ 36—100 |
| 3,032,600 | 5/62 | Mayer _____ 136—6 |

FOREIGN PATENTS 1,357,160  10/20  France.

OTHER REFERENCES

Glasstone, S. and Hickling, A.: Electrolytic Oxidation and Reduction, New York, Van Nostrand Co., 1936, pages 90–92.

JOHN H. MACK, *Primary Examiner*.

MURRAY TILLMAN, JOHN R. SPECK, *Examiners*.

UNITED STATES PATENT OFFICE
CERTIFICATE OF CORRECTION

Patent No. 3,185,590                                            May 25, 1965

Stanley W. Mayer et al.

It is hereby certified that error appears in the above numbered patent requiring correction and that the said Letters Patent should read as corrected below.

Column 1, line 58, for "mental" read -- metal --; column 2, line 40, after "as" insert -- a --; line 61, after "not" insert -- required. The number of --; column 3, line 49, for "the quinone in polymerized" read -- a polymerized quinone in --; column 4, line 21, for "in", second occurrence, read -- is --.

Signed and sealed this 30th day of November 1965.

(SEAL)
Attest:

ERNEST W. SWIDER                                      EDWARD J. BRENNER
Attesting Officer                                         Commissioner of Patents